(12) United States Patent
Appleyard et al.

(10) Patent No.: US 7,944,369 B2
(45) Date of Patent: May 17, 2011

(54) WIRELESS SENSING DEVICE, SYSTEM AND METHOD

(76) Inventors: Brett Ellis Appleyard, Auckland (NZ);
Marcus Stephen Tetro, Auckland (NZ);
Philip Edmund Derisley Wakeman, Auckland (NZ)

(*) Notice: Subject to any disclaimer, the term of this patent is extended or adjusted under 35 U.S.C. 154(b) by 283 days.

(21) Appl. No.: 11/517,385

(22) Filed: Sep. 8, 2006

(65) Prior Publication Data

US 2007/0057804 A1  Mar. 15, 2007

(30) Foreign Application Priority Data

Sep. 10, 2005  (NZ) .................................. 540648

(51) Int. Cl.
*G08B 21/00* (2006.01)
*G01C 9/00* (2006.01)

(52) U.S. Cl. ........................... 340/689; 702/151

(58) Field of Classification Search ............... 340/689, 340/539.12, 573.1; 600/587; 702/150, 151, 702/141
See application file for complete search history.

(56) References Cited

U.S. PATENT DOCUMENTS

| | | | | |
|---|---|---|---|---|
| 5,434,559 A * | 7/1995 | Smiley et al. | ................. | 340/571 |
| 5,760,684 A * | 6/1998 | Orbach | ....................... | 340/457.1 |
| 6,311,406 B1 * | 11/2001 | Yashiro et al. | ............. | 33/366.19 |
| 6,885,924 B2 * | 4/2005 | Ford et al. | ........................ | 701/36 |
| 7,127,370 B2 * | 10/2006 | Kelly et al. | ................... | 702/151 |
| 7,277,009 B2 * | 10/2007 | Hall et al. | ................ | 340/539.22 |
| 7,350,304 B2 * | 4/2008 | Van Luchene | ............. | 33/366.11 |
| 2002/0166756 A1 * | 11/2002 | Thompson | ................. | 200/61.52 |
| 2007/0157385 A1 * | 7/2007 | Lemire et al. | ..................... | 5/600 |
| 2008/0294022 A1 * | 11/2008 | Sharf et al. | .................... | 600/304 |

* cited by examiner

*Primary Examiner* — Benjamin C Lee
*Assistant Examiner* — Sigmund Tang
(74) *Attorney, Agent, or Firm* — Bio IIntellectual Property Services LLC; O. Sam Zaghmout

(57) ABSTRACT

This invention relates to a security device, system and method for use in monitoring an object or person, the device being mountable to an object or person and including a tilt sensing means having a tilt sensor and a control means configured and adapted to detect tilt movement of the said object or person and generating an alarm signal when the detected change of tilt movement of the said object or person exceeds a tilt alarm threshold, the change of tilt movement is between a predetermined normal state of alignment of the said object or person relative to a reference plane and the preset threshold level for triggering an alarm signal.

17 Claims, 5 Drawing Sheets

WIRELESS SENSING DEVICE, SYSTEM AND METHOD

CROSS-REFERENCE TO RELATED APPLICATIONS

This application claims the benefit of New Zealand Patent Application No. 540648 in the names of Brett Ellis Appleyard, Marcus Stephen Tetro and Philip Edmund Derisley Wakeman. The entire disclosure of this prior application is hereby incorporated by reference.

STATEMENT REGARDING FEDERALLY SPONSORED RESEARCH OR DEVELOPMENT

This invention has been created without the sponsorship or funding of any federally sponsored research or development program.

BACKGROUND OF THE INVENTION—FIELD OF INVENTION

This invention relates to sensors, alarm systems and wireless devices. More particularly, but not exclusively, the present invention relates to a wireless sensing device, system and method that senses tilt movement when mounted to an object or person.

BACKGROUND OF THE INVENTION

The use of sensors in alarm equipment is not new. These known sensors, for example, motion, sound or pressure pad sensors, typically provide a feedback trigger signal to activate an audible and/or visible alarm or generate an alert signal for an associated device.

One drawback with standard passive sensors is the inability of such devices to adjust or calibrate the parameters of operation or to automatically adapt to changes in environment and operating conditions, and in the case of wired systems, the time with installing wires between the sensor and alarm unit. Further, in some applications such as the monitoring of a boat being stored on a trailer, the use of components that are wired together is impractical and cumbersome.

It is a non-limiting object of the invention to provide a security device for monitoring an object or person which overcomes at least some of the abovementioned problems, or at least to provide the public with a useful choice.

It is a further non-limiting object of the invention to provide a system for monitoring an object or person which overcomes at least some of the abovementioned problems, or at least to provide the public with a useful choice. It is yet a further non-limiting object of the present invention to provide a method of monitoring an object or person that overcomes at least some of the abovementioned problems, or which provides the public with a useful choice.

SUMMARY OF THE INVENTION

According to a broad aspect of the invention there is provided a security device for use in monitoring an object or person, the device being adapted to be mountable to the said object or person, the device including a tilt sensing means, the tilt sensing means including a tilt sensor and a control means configured and adapted to detect tilt movement of the said object or person and generating an alarm signal when the detected change of tilt movement of the said object or person exceeds a tilt alarm threshold, the change of tilt movement is between a predetermined normal state of alignment of the said object or person relative to a reference plane and the preset threshold level for triggering an alarm signal.

Preferably the tilt sensing means includes a calibration means configured to automatically set the normal state of alignment of the said object or person relative to a reference plane when first mounted, and for resetting the normal state of alignment after an alarm condition has occurred and when the object or person is in a different position from the previous normal state of alignment.

Desirably the security device further includes a sensitivity adjustment means for adjusting the tilt angle of the tilt sensor in degrees or fractions of a degree to enable the tilt alarm threshold to be adjusted and set between a high sensitivity and a low sensitivity.

Preferably the control means is a programmable microcontroller unit. Advantageously the output alarm signal is fed to a signal receiving means, the signal receiving means being adapted to receive signals from the tilt sensing means and initiate an alarm condition.

Optionally the device includes an output means that is adapted to activate an audible alarm and/or a visual alarm and/or trigger an alarm panel switch associated with a building alarm system and/or be adapted via a short message service gateway to send an short message service message and/or to send an electronic mail message over an electronic network of computers.

Preferably the tilt sensing means is adapted with a transmitter means, the transmitter means being provided with a unique identification code to send a coded alarm signal via a wireless communications means to a signal receiving means, the signal receiving means being adapted to receive a coded alarm signal and identify the transmitter means.

According to a second aspect of the invention there is provided a method of monitoring the status of an object or person using a tilt sensing means, the tilt sensing means including a tilt sensor and a control means, the method including the steps of:
  a. mounting the tilt sensing means on a said object or person and allowing the tilt sensing means to automatically calibrate to set the normal state of alignment of the said object or person relative to a reference plane;
  b. selecting user operating preferences including a tilt alarm threshold representing the threshold of movement or non movement between a normal state and the tilt alarm threshold above which an alarm state condition occurs; and
  c. generating and sending an alarm signal when the alarm condition occurs.

Preferably in step b. the sensing means is configured to repeatedly self recalibrate to reset the normal state of alignment of the said object or person relative to a reference plane to allow for small variations in movement of the object or person within the preset tilt alarm threshold.

Preferably in step c. the tilt sensing means is adapted with a transmitter means to send an alarm signal via a wireless communications means to a signal receiving means, and wherein the signal receiving means is adapted to trigger an alarm means when an alarm state in a tilt sensing means has occurred.

Desirably in step b. the tilt alarm threshold is adjustable by a sensitivity adjustment means, the sensitivity adjustment means being configured and arranged to adjust tilt angle.

Optionally in the application for detecting the non-movement of an object or person, in step b. the normal state is when the object or person is in continual movement within a preset tilt time threshold, and wherein the alarm state is activated when the object or person stops moving for a longer time period than a preset tilt time threshold.

Preferably the method further comprises the step of the tilt sensing means generating and sending periodically a supervision signal to the signal receiving means to confirm that the tilt sensing means is functioning, and, if the signal receiving means does not receive a supervision signal within a predetermined period of time, a trouble alarm will be activated to indicate a fault condition with the tilt sensing means.

According to a third aspect of the invention there is provided a security monitoring system for use in monitoring an object or person, the device being adapted to be mountable to the said object or person, the device including a tilt sensing means, the tilt sensing means including a tilt sensor and a control means configured and adapted to detect tilt movement of the said object or person and generating an alarm signal when the detected change of tilt movement of the said object or person exceeds a tilt alarm threshold, the change of tilt movement is between a predetermined normal state of alignment of the said object or person relative to a reference plane and the preset threshold level for triggering an alarm signal, the alarm signal being fed to a signal receiving means, the signal receiving means being adapted to receive the alarm signal from the tilt sensing means and trigger an alarm state.

Preferably the signal receiving means is adapted to activate an audible alarm and/or a visual alarm and/or trigger an alarm panel switch associated with a building alarm system and/or be adapted via a short message service gateway to send an short message service message and/or to send an electronic mail message over an electronic network of computers when it receives an alarm signal from the tilt sensing means.

Desirably the tilt sensing means is adapted with a transmitter means to send an alarm signal via a wireless communications means to the signal receiving means adapted to receive the said alarm signal.

Preferably the tilt sensing means is adapted with a transmitter means, the transmitter means being provided with a unique identification code to send a coded alarm signal via a wireless communications means to a signal receiving means, the signal receiving means being adapted to receive a coded alarm signal and identify the transmitter means.

Optionally a plurality of tilt sensing means are monitored by the signal receiving means, and wherein the signal receiving means will identify and distinguish signals received from each tilt sensing means.

BRIEF DESCRIPTION OF THE DRAWINGS

Preferred and alternative embodiments of the invention will now be illustrated, by way of example only, with reference to the accompanying drawings in which.

DETAILED DESCRIPTION OF THE DRAWINGS

Figure 1:
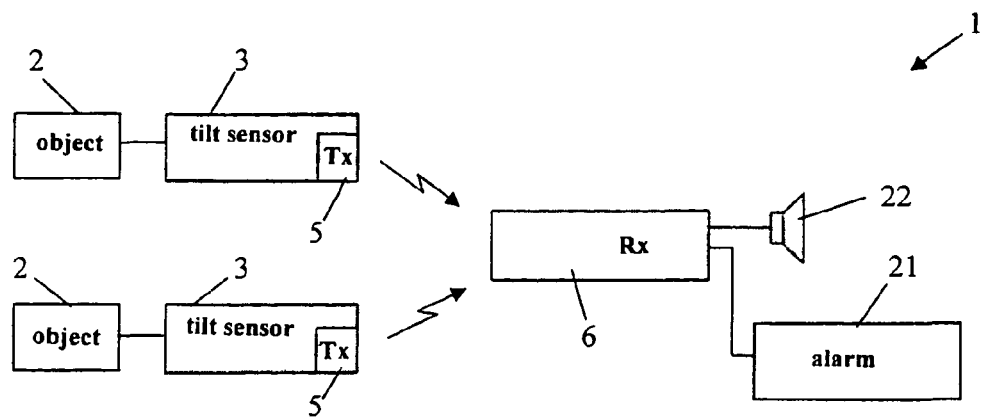
FIG. 1: illustrates a schematic block diagram of a monitoring system 1.
Figure 2:
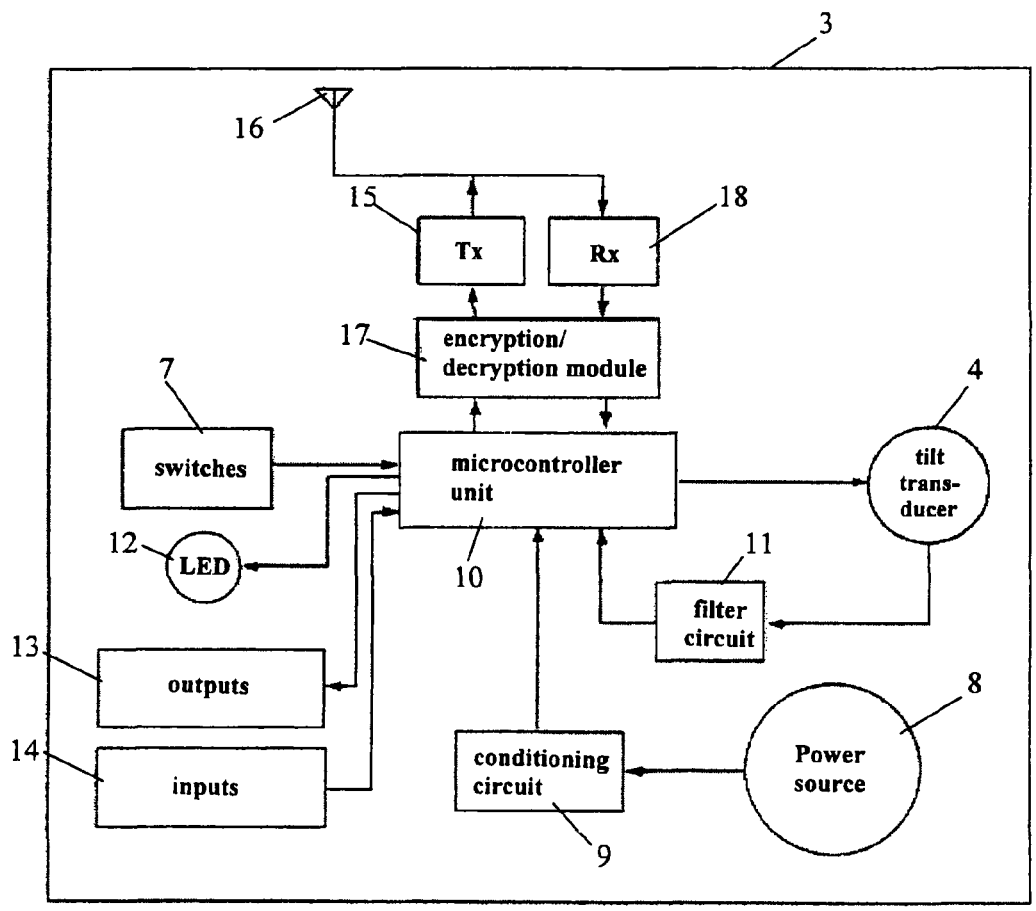
FIG. 2: illustrates a schematic block diagram of main components of a tilt sensing means 3.

Referring to FIGS. 1 to 2, schematic block diagrams of main components of a tilt sensing means 3, and a monitoring system, generally referred to as 1, according to a preferred embodiment of the invention, is illustrated.

A security monitoring system 1 is configured and arranged for use in monitoring the status, and more particularly the tilt movement, of an object or person 2. The system 1 includes a tilt sensing means including at least one tilt sensing device or unit 3. Hereinafter references to the tilt sensing means 3 will be referred to particularly as the tilt sensing unit 3 for convenience, and it will be appreciated that the reference will be interpreted broadly. The tilt sensing unit 3 advantageously includes a tilt transducer or sensor 4 and desirably a communications means such as, for example in the preferred embodiment, a radio transmitter means 5, the sensor 4 being configured and arranged to detect a change in movement or state of the object or person 2 being monitored and will generate an alarm signal or alarm condition accordingly.

The tilt sensing unit 3 is preferably wireless with signals being sent via a wireless communication means. In this respect the signal receiving means 6 will be adapted to receive signals as transmitted from the tilt sensing unit 3.

It will be seen that the wireless communications means can be any known type of wireless technology including, for example, radio frequency or infra red technologies. In this embodiment, signals are preferably transmitted by radio frequency at any suitable frequency and band, and more preferably the system is adapted to send signals by frequency modulation in the Very High Frequency (VHF) or Ultra High Frequency (UHF) bands or frequency ranges. More desirably, signals in the UHF range are applied. In one non-limiting example, a transmitting frequency of 433 MHz is used with any readily available off the shelf transmitter or customised, as required. However, it will be appreciated that, due to countries establishing regulations allocating different frequency bands to different purposes, the frequency range applicable for a particular country may well necessitate a different transmitter frequency to meet regulatory requirements. For the USA, it is considered that a higher frequency is likely to be applied, although it will be appreciated that a frequency will be selected with considering the allowable frequency bands available for transmission of signals.

In New Zealand, where a frequency of 433 MHz is allowable for transmission for such a system 1 of the invention, the tilt sensing unit 3 may be adapted to incorporate an off the shelf frequency modulated (FM) transmitter module (such as module FM-RTFQ1-433) and wherein a corresponding FM receiver module (such as module FM-RRFQ1-433), seen as a matching pair, is incorporated in the signal receiving means 6. Other readily available matching transmitter/receiver pairs, or transceivers and any bi-directional radio connections for two way communications between devices are envisaged within the scope of the invention, and will be incorporated in the system 1 as required or desired.

It will be seen that other communication devices and modulation techniques for the transmission and reception of signals between devices are envisaged such as, for example only, AM (Amplitude Modulation), Direct Sequence Spread Spectrum and Frequency hopping methods.

Referring now more particularly to FIG. 2, main components of the tilt sensing unit 3 is now described.

The tilt sensing unit 3 is provided with a suitable power means, such as a battery 8 with a long life capacity, for supplying power to electrical elements or the main components of the unit 3. It will be appreciated that any suitable form of power input can be provided, whether battery or solar power with associated transforming and filtering circuitry, or by mains power supply through a suitable transformer to supply a low DC voltage. The input power supply is fed to a power conditioning circuit 9, and then fed into a control means preferably in the form of a suitably programmed microprocessor controller means that is desirably in the form of a microcontroller unit 10. Any suitable off the shelf microcontroller unit 10 can be provided so long as it can be duly programmed to control the various components and be programmed to carry out the control, monitoring and supervisory functions of the tilt sensing unit 3. Further details of the main processing steps are described below with reference to the flow chart of FIG. 5.

The tilt transducer or sensor 4 used in the device is any known and suitable tilt sensor or transducer that is of a type that can detect tilt or tilt movement of the object or person 2 to which the tilt sensing unit 3 is mounted. Further details are described with reference to FIG. 3. One suitable type is an electrolytic tilt sensor that is known in the art and which is readily available.

In this embodiment of the invention, it is seen that the microcontroller unit 10 will be suitably computer programmed to generate transducer drive signals to drive the tilt sensor 4, and output signals from the sensor 4 are conditioned through conditioning circuit 11 and fed into the microcontroller unit 10.

The sensitivity of the sensor 4 can be advantageously adjusted via a sensitivity adjustment means desirably in the form of a configuration switch 7 that is mounted to the unit 3. It will be appreciated that input commands and configuration functions can be performed using any known device such as, for example, a dual in line package (DIP) switches, jumpers, and/or via keyboard or keypad devices and software configuration techniques, as appropriate.

The configuration switch 7 may include a DIP switch that is desirably of a multifunctional type with a plurality of switches and settings, and wherein a few of the switches are configured and arranged for adjusting sensitivity of the sensor 4, as required.

The configuration switch 7 serves other purposes such as being configured with the unit 3 to set a stand down time period or power down period of between, say, 2 to 16 minutes, or any other suitable time period. This stand down time period feature will allow battery power to be conserved. This is particularly useful for applications whereby an object is in constant movement but does not need to be monitored, such as a boat on a trailer that is being driven to a launch site or is in use on water.

A further feature of the invention and one whereby the configuration switch 7 can be used to set an operating parameter is referred to as a walk test mode. The walk test mode is when the unit 3 can transmit signals when it is tilted and the stand down time does not apply, and is useful for verifying that the settings of the unit 3 are appropriate for the application.

Further, the unit 3 preferably includes a signal diagnostic means for set up and configuration purposes, and a signal diagnostic means desirably includes an indicator means in the form of at least one LED 12 that is configured for use to provide feedback signals to a user. Other forms of signal diagnostic means may be implemented such as an LCD screen and/or an array of LED's with various colours.

Output means in the form of outputs 13 can be configured and adapted for a variety of useful purposes, and one such purpose is to enable a local alarm means 22 to be activated and/or trigger a circuit or device that immobilises the object 2 in some way, such as in the case of the object 2 being a vehicle (not shown) that has been moved without authority from say a commercial sales yard, or it can optionally be configured to activate an alarm system or alarm that is associated with the system 1. A non-limiting example of an activation is with an output alarm signal being fed into a local alarm panel 21. Further, the outputs can be configured to activate a visual alarm and/or trigger an alarm panel switch associated with a building alarm system and/or be adapted via a short message service (SMS) gateway to send an SMS message and/or to send an electronic mail message over an electronic network of computers.

Inputs 14 can be provided to the microcontroller unit 10 for connecting a reed switch and/or a tamper switch and/or an alarm or key switch or other radio transmitter or otherwise that is controlled by the unit 3, for local arming purposes or otherwise, as required. In a configuration using a magnetic reed switch, it will be seen that the reed switch, when triggered, will cause the unit 3 to generate and transmit an alarm signal to the signal receiving means 6.

When an alarm state is triggered by preset tilt alarm thresholds being measured by the tilt transducer or sensor 4, the microcontroller unit 10 activates an output alarm signal that may be optionally encrypted via an encryption/decryption module 17 and then fed through a transmitter module 15 that transmits the alarm signal to the signal receiving means 6. A suitable antenna 16, whether internally mounted or adapted to be externally arranged or mounted, is attached to the output side of the module 15 to transmit the alarm signal at a preset frequency or preset frequencies depending on the method of transmission employed. For multiple frequency methods it is considered that methods such as spread spectrum or frequency hopping could be used, as required. For the application of a preset frequency in the system 1, it may include any suitable frequency depending on the application or other considerations, and may be more desirably in the VHF or UHF frequency bands, local frequency restrictions, distance between the transmitter and receiver and signal strength considerations, restraints with power output and antenna size, or otherwise.

Optionally the unit 3 may be adapted with a signal receiving module 18 to enable the unit to function as a transceiver such that the unit 3 and a second receiving unit such as the signal receiving means 6, are provided with a two way wireless communication means. Signals would be received through the module 18 and then fed through the decryption module 17 into the microcontroller unit 10.

Advantageously the invention includes a system supervision means that, when configured, allows the tilt sensing unit 3 and the signal receiving means 6 to communicate at programmed or predetermined intervals to ensure the system 1 is operating properly. More particularly, and in one non-limiting example of an application, the unit 3 is configured to send supervision signals at periodic time intervals to the signal receiving means 6. The signal receiving means 6 is configured and programmed to receive supervision signals within a preset or predetermined time interval, and if the signal receiving means 6 fails to receive a certain supervision signal within the preset period of time (referred to as the "supervision fail timeout"), it will generate a trouble alert signal and communicate the trouble status by any communication means as programmed as configured, to a user or supervisor of the system. The configuration switch 7 can be configured to allow user adjustments of the preset supervision time interval, between say, for example, 1 to 60 minutes, and the supervision fail timeout, between say, for example, 1 minute to 12 hours, more or less, and it will be seen that the number of system checks carried out can vary depending on the battery life of components or devices of the system 1. It will be seen that if components are hard wired into mains power supply, or are provided with a portable high capacity power supply, a greater frequency of supervision signals may be optionally applied to ensure greater integrity of the system 1. It will be appreciated that the frequency or duration of supervision signals should comply with radio frequency regulations in the particular country of use, in the case where the communication means in the system 1 is by radio frequency signals.

It is seen that when the unit 3 is configured to operate as a two way link with the signal receiving means 6, a higher level of communication can ensue between the sensing unit 3 and the signal receiving means 6, and optionally other related components of the system 1.

Figure 3:
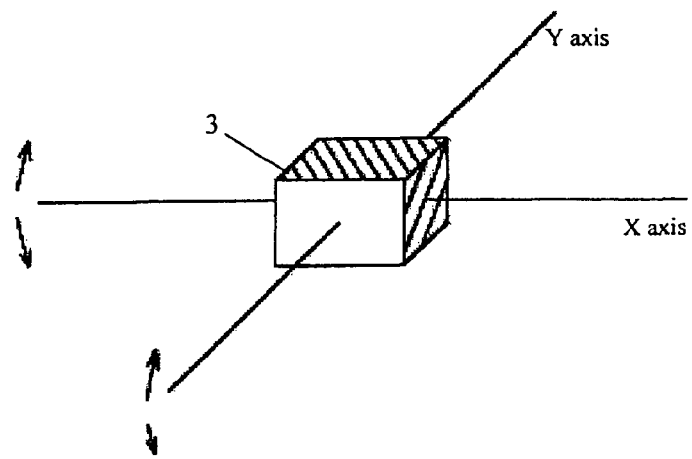
FIG. 3: illustrates the movement detected relative to the axes of the tilt sensing means 3.

Referring now to FIG. 3, the tilt movement detected relative to the X & Y axes of the tilt sensing means 3, is illustrated It is considered that movement can be defined as the change in position of the sensor 4 relative to any suitable and convenient reference plane, such plane may be, for example, the horizontal plane and a preset tilt alarm threshold level. It is considered that any reference plane may be selected. Such tilt angle movement is defined as the "tilt" and is measured in degrees or fractions of a degree in the X-axis and/or the Y-axis, as indicated in FIG. 3. The tilt alarm threshold then is the threshold between a predetermined normal state of alignment relative to a reference plane and a preset threshold tilt angle from that reference plane.

The sensor 4 is any suitable movement or tilt sensing means, and in this non-limiting embodiment is desirably an electrolytic sensor that provides an output signal that may be an analogue or digital signal, and which can be adjusted for sensitivity depending on the application or particular object or person being monitored. It is seen as an advantageous feature with configuring and arranging a sensor 4 that can measure degrees and fractions of a degree.

The sensitivity setting of the device can desirably be adjusted to suit conditions. It will be seen that the highest sensitivity setting, that sets a low tilt angle before the tilt alarm threshold is exceeded, may advantageously be set for monitoring an object in a garage or enclosed area where there is minimal exposure to wind or animals, or other factors that could cause spurious movements of the object. The lowest sensitivity setting, that sets a high tilt angle before the tilt alarm threshold is exceeded, could be applied to objects that may be touched or bumped and for which a significant or substantial tilt measurement must be detected to cause a change in movement beyond the tilt alarm threshold and trigger an output alarm signal.

The tilt sensing unit 3 can operate in many states, and for purposes of ease of description the operation is described with the two main states, a normal state and an alarm state. The unit 3 is configured such that the amount of movement required to change from the normal state to an alarm state is referred to as the tilt alarm threshold. The amount of time that the unit 3 must detect the tilt alarm threshold before changing state from the normal state to the alarm state or from the alarm state to the normal state is referred to as the tilt time threshold. In the normal state, the tilt sensing unit 3 advantageously is configured to continually adjust the tilt alarm threshold to ensure that changing environmental or operating conditions such as temperature, operating voltage and extremely slow changes to tilt, do not cause a false alarm condition to occur.

The tilt alarm threshold is checked and processed by the tilt sensing unit 3 at regular intervals in such a unique way that the position representing the normal state is redefined or reset or recalibrated whenever the tilt sensing unit 3, in use, remains stationary for a preset or predetermined period of time.

It is seen as an advantageous feature of the invention that the tilt sensing unit 3 will be configured and arranged to automatically set or reset its normal state in its installed position. This feature is a form of automatic calibration that enables installation of the tilt sensing unit 3 to be a lot more simpler as it does not need to be installed in a precisely defined position such as horizontal or otherwise. In fact the unit 3 can be mounted to an object 2 using any known and suitable bracket means, and such installation can be at a tilt of any angle, and in one non-limiting example it is seen that if it is mounted in a position of between +45 degrees and substantially about −45 degrees from the horizontal position, when the system 1 starts operating, the unit 3 can desirably automatically recalibrate and reset relative to the particular tilt or incline of the object or the unit 3 as installed. This feature makes installation and setting up the system 1 easier and is considered to be a very unique and useful aspect of the invention.

Alternatively, it is also considered that the unit 3 can employ a tilt transducer means or sensor arrangement that allows the system 1 of the invention to operate in any position or orientation.

The signal receiving means 6 is advantageously configured and adapted to allow for a plurality of outputs for interfacing with additional components, and more particularly interfacing with components such as alarm panels 21 associated with a house or building alarm system; a local alarm means 22 such as a piezoelectric siren; and/or feed an output alert signal into the alarm panel 21 adapted to transmit a signal to a security monitoring service company usually associated with providing security for buildings and property, or feeding into other control systems such as electronic access control systems or asset tracking systems. The output of the signal receiving means 6 may optionally also interface with a local paging system, short message service (SMS), electronic mail, internet or other known forms of notifying technologies.

The signal receiving means 6 is also configured to monitor the alarm states of a plurality of tilt sensing units 3 that each use a different identification code. In this respect, it is seen that each tilt sensing unit 3 should be first desirably programmed or learned to the receiving means 6 when each unit 3 is attached to the signal receiving means 6. The learning process is required to allow the receiving means 6, in use, to be configured to monitor the particular sensing unit 3 and its unique transmitting code so that all alarm and supervision signals and the like can be received and processed by the signal receiving means 6.

Figure 4:
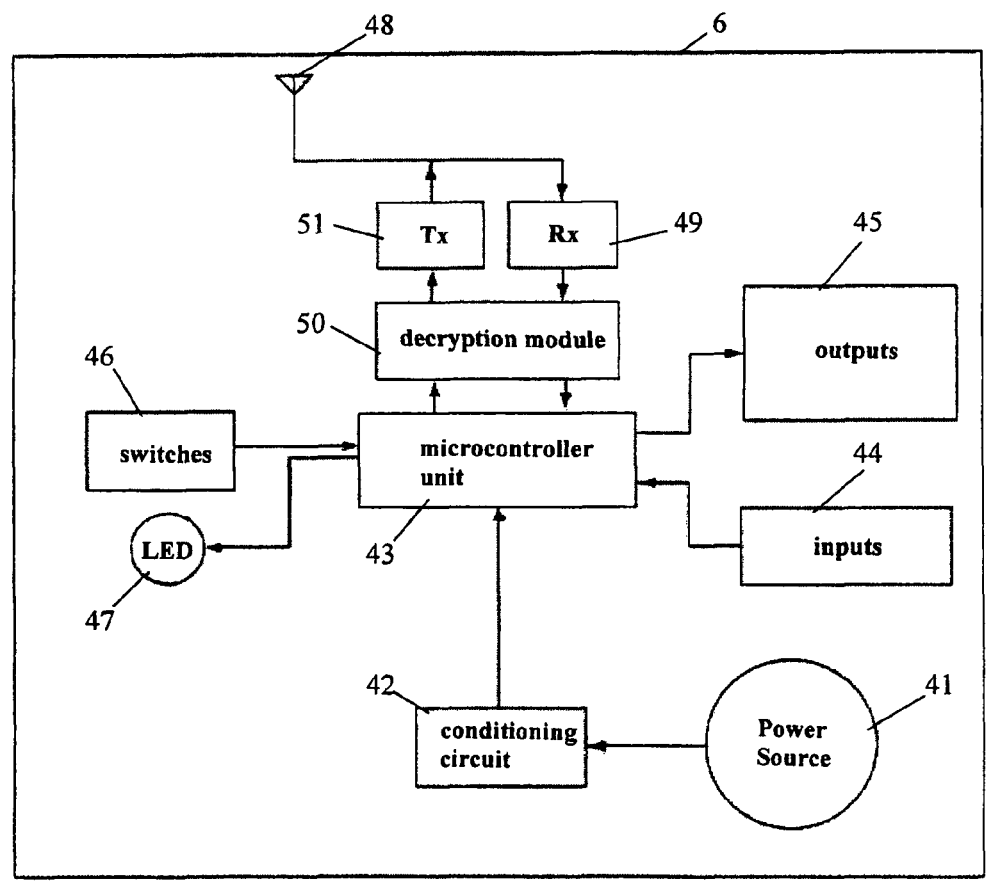
FIG. 4: illustrates a schematic block diagram of main components of a signal receiving means 6.

Referring now more particularly to FIG. 4, main components of the signal receiving means 6, is now described.

The signal receiving means 6 is provided with a suitable power means, such as a battery 41 with desirably a long life capacity, for supplying power to electrical elements or the main components of the signal receiving means 6. It will be appreciated that any suitable form of power input can be provided, whether battery or by mains power supply through a suitable transformer. The input power supply is fed to a power conditioning circuit 42, and then fed into a suitably programmed microprocessor controller means in the form of a microcontroller unit 43. Any suitable off the shelf microcontroller unit 43 can be provided so long as it can be programmed to control the various components of the signal receiving means 6 and be programmed to carry out the control, monitoring and supervisory functions of the signal receiving means 6. A description of the main processing steps are described below and with reference to the flow chart of FIG. 6.

It is seen that the signal receiving means 6 is configured and programmed to receive signals from the tilt sensing unit 3 and typically either operates as a stand alone alarm system and triggers a local alarm 22 or is interfaced with an existing alarm panel 21 and thus feeds an activation signal to the alarm panel 21 (as seen in FIG. 1).

The signal receiving means 6 is configured to accept inputs 44 in the form of direct alarm signals, telemetry and serial data, and such inputs are checked and processed by the microprocessor unit 43 as programmed, and an alarm signal activated if conditions are met.

If alarm conditions are met, the microprocessor unit 43 can generate an output signal that is fed through output circuitry 45, including relays, to alarm panels and other electronic control systems, display devices, or otherwise.

Configuration switches 46 are associated with the microprocessor unit 43, and an indicator means desirably in the form of at least one LED 47, to arm and disarm the receiving means 6, set up and/or change various operating parameters and to configure and change time periods for alarm states or otherwise. It will be appreciated that input commands and configuration functions can be performed using any known device such as, for example, DIP switches, jumpers, and/or via keyboard or keypad devices and software configuration techniques, as appropriate. The configuration switches 46 may therefore include a DIP switch or switches, jumpers, or even being configured in part or whole via any desirable software configuration.

The LED 47 is associated with the microcontroller unit 43 for use to provide feedback signals to a user. Other forms of indicator means may be implemented as desired such as an LCD screen and/or an array of LED's.

The signal receiving means 6 includes a suitable antenna 48 tuned to receive alarm signals from the transmitter of at least one tilt sensing unit 3. The antenna 48 is desirably an internally mounted device in the unit 3. Alternatively, the antenna 48 may be adapted to be externally mounted and arranged to connect to the circuitry of the signal receiving means 6.

An input alarm signal will be received in a receiving module 49 and then, as the signal may have been encrypted by the tilt sensing unit 3, would be fed into a decryption module 50 and suitably decrypted before being processed by the microcontroller unit 43. An optional transmitting device 51 is included in the circuit in the configuration where two way communication between a tilt sensing unit 3 and the signal receiving means 6 is utilised.

Figure 5:
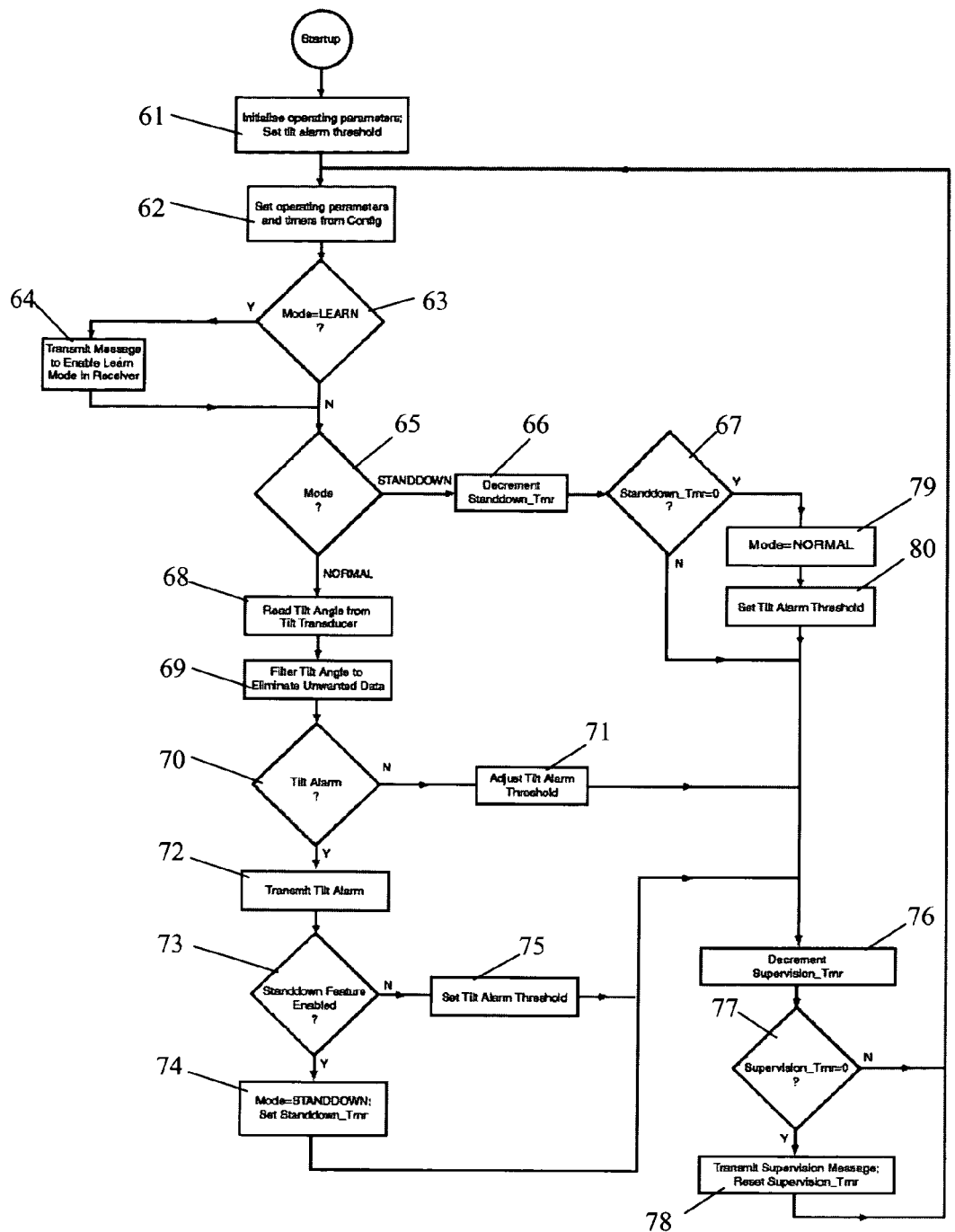
FIG. 5: illustrates a flow chart of broad processing steps of the tilt sensing means 3.

Referring now to FIG. 5, a flow chart of main processing steps of the sensing unit 3, is illustrated. This flow chart is to be read in a system arrangement whereby at least one tilt sensing unit 3 operates in conjunction with a signal receiving means 6.

When the sensing unit 3 is powered up, in accordance with a preliminary step, indicated by box 61, any preset operating parameters will be initialised, and the tilt alarm threshold can be set.

A user may then, as the first main step as indicated by box 62, set and/or adjust operating parameters such as the sensitivity of the sensor 4 and time out periods, which may be set or adjusted via the configuration switch 7. As indicated by decision box 63, if a sensing unit 3 has not been recognised and accepted as a tilt sensing device for monitoring by the receiving means 6, then a signal will be generated and transmitted to the receiving means 6 to enable the learn mode to be activated in the receiving means 6, indicated by box 64, and an unique identifier code for the particular tilt sensing unit 3 should be accepted by the receiving means. Decision box 65 is the step whereby the mode is selected and if the stand down mode is selected, the unit 3 can conserve power by triggering a stand down timer as indicated by box 66, and wherein in decision box 67 the stand down timer is triggered and times out at the preset time period. When such timeout occurs, as seen by box 79, the tilt sensing unit 3 reverts back to normal mode and then, as indicated by box 80, the tilt alarm threshold is reset according to the current tilt angle. If a normal mode is selected in decision box 65, the unit 3 in box 68 will read tilt angle measurements from the tilt sensor 4, and in box 69 will filter the tilt angle to remove any unwanted data.

With decision box 70, the step of comparing the tilt angle measurement with the tilt threshold is made, and if the tilt alarm threshold is not exceeded, no alarm signal will be transmitted. An adjustment of the tilt alarm threshold, as indicated by box 71, can be made if required. It is considered that minor adjustments caused by changing environmental or operating conditions such as temperature or operating voltage can be initiated as required, and such adjustments are considered important to reduce the occurrence of false alarm conditions.

When an alarm condition occurs, decision box 70 determines that the tilt alarm threshold has been exceeded, and as indicated by box 72, at least one alarm signal is transmitted to the signal receiving means 6 for processing. To increase the likelihood that the alarm signal transmitted is received by the signal receiving means 6, the unit 3 can be programmed to transmit repeated or multiple alarm signals, for example, 10 alarm signals at random intervals between, say, 2 and 19 seconds apart, for up to a preset time period. This repetition of alarm signals will increase the likelihood of interference or from other transmitted signals being sent at the same time causing a problem with the receiving means 6 not receiving that particular alarm signal. Further, in accordance with an alternative embodiment of the invention, the unit 3 and the receiving means 6 are provided with 2 way communications means whereby the receiving means 6 is adapted to transmit an acknowledgement signal back to the unit 3 to confirm that the alarm signal has been duly received.

Decision box 73 determines whether a stand down mode is initiated as indicated by box 74 to initiate a time out period which is a process for conserving battery power, and wherein any further transmissions are disabled.

If the stand down mode is not initiated, as indicated by box 75, a new sensitivity tilt alarm threshold can be recalculated to accommodate the new position of the tilt sensor 4 and object 2 or person being monitored. This setting will then become the new normal tilt position and any deviations from this new normal position will be monitored to determine whether the tilt alarm threshold has been exceeded.

As indicated by boxes 76, 77, 78, a supervision interval is timed out at a preset time period and a supervision signal can be transmitted to the signal receiving means 6 to provide an assurance to the receiving means 6 that the tilt sensing unit 3 is still functioning properly and is capable of sending alarm signals. Information including the status of the battery of the unit 3 can also be communicated to the receiving means 6. The supervision interval can be any desirable time period, and can be set, for example, at typically between 4 to 60 minutes. Should no supervision signal be received by the signal receiving means 6, a trouble signal can be generated to alert a user to a problem state in the tilt sensing unit 3 which may usually indicate that the battery should be recharged or changed, or that an alarm or supervisory signal is not being transmitted or received. It is seen then that the tilt sensing unit 3 can periodically generate and send a supervision signal to the signal receiving means 6 to confirm that the tilt sensing means 3 is functioning, and, if the signal receiving means 6 does not receive a supervision signal within a predetermined period of time, a trouble alarm will be activated to indicate a fault condition with the tilt sensing unit 3.

A feedback loop completes the processing cycle, and, unless the mode is changed, will continue monitoring the object or person 2 accordingly.

Figure 6:
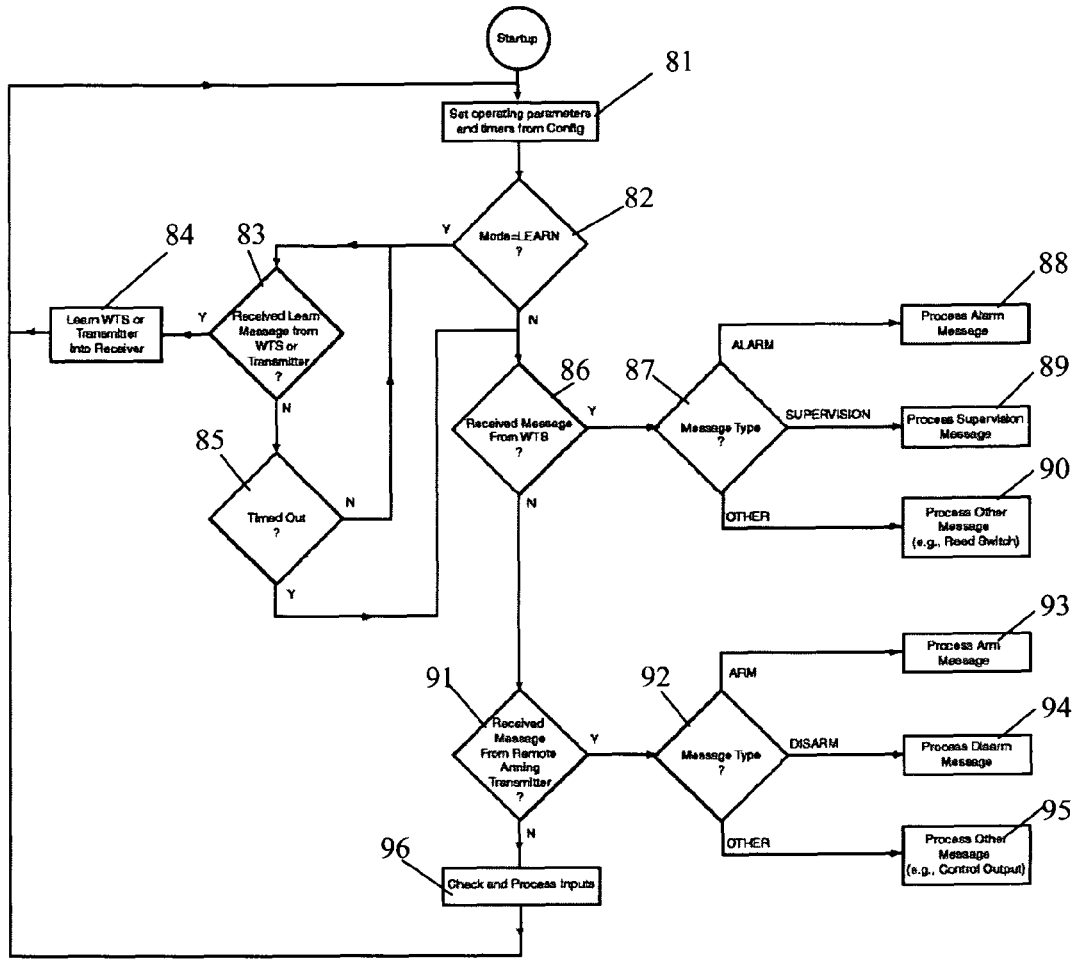
FIG. 6: illustrates a flow chart of broad processing steps of the signal receiving means 6.

Referring now to FIG. 6, a flow chart of main processing steps of the signal receiving means 6, is illustrated.

On start up, as indicated by box 81, a user may set operating parameters of the receiving means 6, including various time out periods, and arm or disarm the receiving means 6 via mode jumpers or using mode pins that can be connected to a key switch or relay output to allow a remote device to arm or disarm the receiving means 6, as required.

In accordance with decision box 82, the receiving means 6 must learn or be programmed to register at least one or more tilt sensing units 3 that the receiving means 6 operates with to monitor the object(s) or person(s) 2. The memory of the microprocessor unit 43 may preferably be erased to delete all previously learned transmitters for tilt sensing units. To trigger the process of learning all transmitters 5 from tilt sensing units 3, as indicated by decision boxes 83, 85 and box 84, a user will reset the tilt sensing unit(s) 3, and then initiate a learn process via a learn button on the transmitter of each unit 3, and the learn mode will be enabled in the receiving means 6. It will be seen that the LED 47 should flash and then blink normally to indicate that the receiving means 6 has picked up the unit(s) 3 to be monitored.

The receiving means 6 is then configured to receive transmit signals from the tilt sensing unit(s) 3. As indicated by decision box 86, the incoming signals are received and decrypted if required, and then identified by decision box 87 as either an alarm signal, indicated by box 88, or a supervision signal, indicated by box 89, or other type of monitoring signal such as a signal triggered by a low battery or by a reed switch, as indicated by box 90. With processing an alarm signal according to box 88, an alarm may be activated for any preset period of time, and the alarm is then reset. For a supervision signal that indicates that the or one of the tilt sensing units 3 is not transmitting supervisory signals, a trouble alarm mode will be activated, and an alarm condition will be activated for a preset period of time.

A further step of remote arming and disarming of the receiving means 6 can be employed, and decision box 91 can be activated to receive signals indicating an alarm signal that is determined by box 92 and processed. If an arm signal is received, in accordance with process box 93, the outputs 45 are turned on to activate any alarms during alarm and trouble (supervisory) conditions. If the decision box 92 determines that a disarm signal has been received, box 94 will result in the outputs 45 not being activated when alarm or trouble conditions are detected. Any other signal types configured and determined by box 92 can trigger another additional process as required. For example, a control signal could be received, causing a trigger event in a customised output to say, immobilise a vehicle in the application of the tilt sensing unit 3 monitoring the status of a vehicle in a car yard.

Optionally a process may be incorporated for checking digital or analog inputs, as indicated by box 96, and thus could result in the operating parameters being adjusted or any other desirable or appropriate action being taken.

Figure 7:
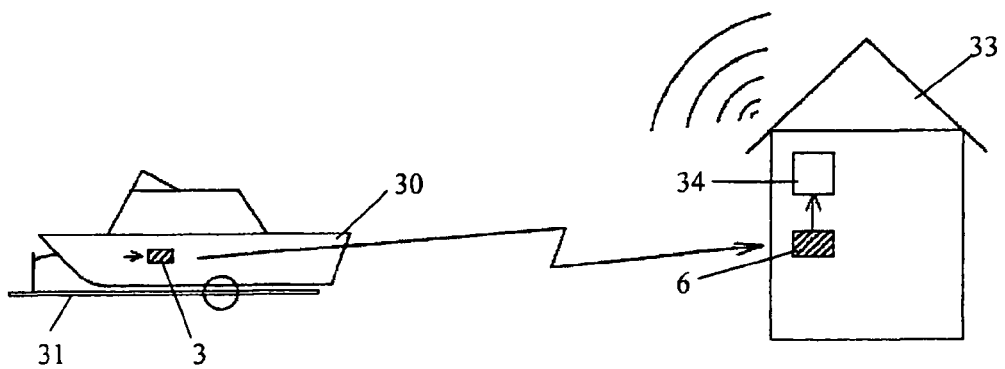
FIG. 7: illustrates the security device as applied to monitor a boat on a trailer.

Referring now to FIG. 7, a typical application of the invention as applied to monitoring a boat as stored on a trailer, is illustrated.

In this non-limiting application, it is seen that a tilt sensing unit 3 is suitably mounted and installed to a power boat 30 resting on a boat trailer 31. A signal receiving means 6 is installed in a house or building 33 within the usual operating range of the system 1, typically substantially between 50 to 200 meter, depending on factors such as obstructions located between the unit 3 and the receiving means 6. The receiving means 6 is desirably adapted to be hard wired into the building's mains power supply, with any suitable transforming and filtering circuits applied, as required, and also an output is fed into the building's existing security alarm system 34.

It is seen in this non-limiting example that easily moveable objects such as a boat 30 on a trailer 31 can be a vulnerable target on a property, and the invention is particularly suitable to monitor the movements of such objects. In operation, the tilt sensing unit 3 is installed and is placed within the operating range of a signal receiving means 6. The tilt sensing unit 3 will automatically calibrate on power up, and send a test signal to the receiving means 6 to enable the receiving means 6 to register the identification code of the sensing means 3 and to establish monitoring protocols such as the nature and frequency of the supervision signals, and setting of the sensitivity threshold to accommodate the position of the sensing unit 3.

Figure 8:
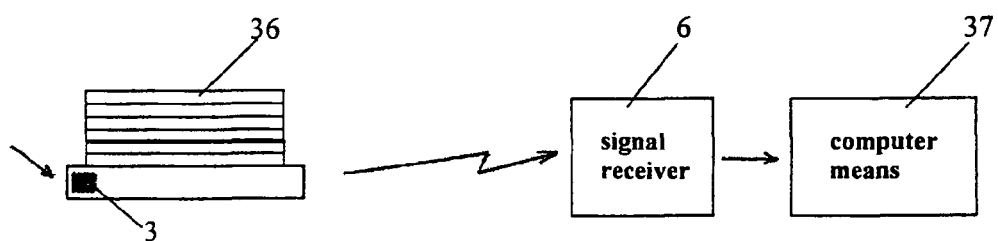
FIG. 8: illustrates the security device as applied to monitor pallets in a warehouse.

Referring now to FIG. 8, the monitoring system 1 as applied to monitor pallets in a warehouse, is illustrated.

In this example, it is seen that a tilt sensing unit 3 is suitably mounted to one or more pallets 36 in a warehouse environment or otherwise. The figure only illustrates one pallet but it will be appreciated that in accordance with an aspect of the invention a plurality of tilt sensing units 3 can be mounted on respective pallets 36. In operation, when a pallet 36 is moved, an alarm signal or movement signal is transmitted to a signal receiving means 6. The alarm or movement signal advantageously includes an identification code to identify the particular pallet 36 being moved or tampered with prior to freighting to its destination, or otherwise. Such monitoring is useful, particularly for hazardous goods wherein any tampering may be dangerous to health or where any unauthorised movements may be of concern. The signal receiving means 6 can be desirably located adjacent a computer means 37 that is adapted to receive data from the output of the signal receiving means 6 relating to the identity, position and/or movement details of the pallet 36 being monitored.

Another example of the application of the invention is with monitoring valuable property inside a house or building such as a museum or otherwise, wherein the tilt sensing unit 3 is mounted to the artefact or other such object, and signals relating to the movement of the artefact are communicated to a receiving means and actioned, as required.

Yet a further application of the invention is with monitoring vehicles in a vehicle sales yard, which can incorporate very similar components to that used in relation to artefacts or pallets being monitored. It is considered that the signal receiving means 6 can be adapted to receive alarm and supervisory signals from various tilt sensing units 3 mounted and operating on respective vehicles in the yard. If a particular vehicle is being tampered with, for example, the vehicle is being jacked up to remove a wheel, an alarm condition will be activated accordingly.

Figure 9:
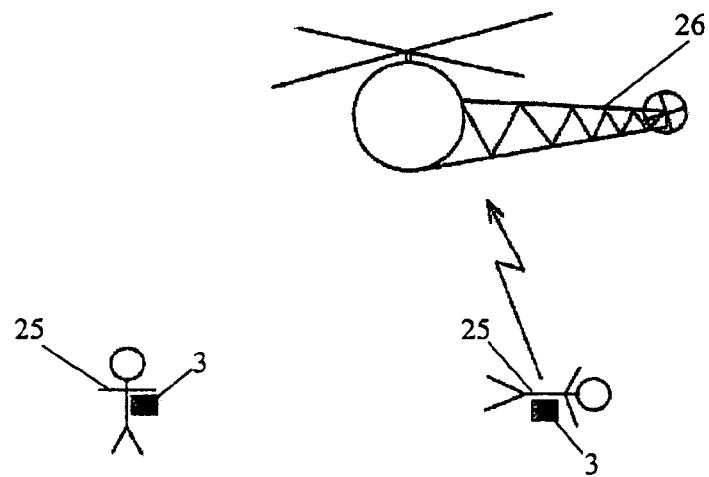
FIG. 9: illustrates the tilt sensing unit 3 as applied to monitor the movement of a person.

Referring to FIG. 9, the monitoring system 1 as applied to monitor the movement of a person, is illustrated.

In this non-limiting example, the system 1 of the invention is configured and arranged such that the normal state of the tilt sensing unit 3 is with movement of the person, and wherein the alarm state or alarm condition occurs when movement of the person 25 and unit 3 ceases for a preset period of time. The unit 3 can be attached to say a person using a strap or buckle, and such person may be a tramper or other such person 25 that is expected to be moving throughout a period of time. Should that person 25 cease moving for a preset period of time, an alarm signal can be generated and suitably transmitted to an associated signal receiving means 6 that may be located in a moving aircraft 26 or otherwise, and action taken accordingly. It is considered that the transmitting frequency, power and modulation technique will desirably be selected to enable search and rescue personnel and their proprietary control systems to successfully receive a distress alarm signal being transmitted from the unit 3 on the person 25. It will be seen that a suitable radio transmission can be received by a suitable receiving means 6 located either on a sea vessel and/or aircraft and/or located on land and processed by existing alarm systems accordingly.

It will be appreciated with the above example that the tilt sensing unit 3 can be attached to an animal for tracking purposes or monitoring purposes.

Wherein the aforegoing reference has been made to integers or components having known equivalents, then such equivalents are herein incorporated as if individually set forth. Accordingly, it will be appreciated that changes may be made to the above described embodiments of the invention without departing from the principles taught herein.

It is to be understood that the above description is intended to be illustrative, and not restrictive. Additional advantages of the present invention will become apparent for those skilled in the art after considering the principles in particular form as discussed and illustrated. Thus, it will be understood that the invention is not limited to the particular embodiments described or illustrated, but is intended to cover all alterations or modifications which are within the scope of the appended claims.

The invention claimed is:

1. A security device for use in monitoring an object, the security device, in use, being mounted directly to said object to be monitored, the security device including a tilt sensing means, the tilt sensing means including a tilt sensor and a control means configured and adapted to detect tilt movement of the said object caused by unauthorized movement of the object and generating an alarm signal when the detected change of tilt movement of the said object exceeds a tilt alarm threshold, the change of tilt movement is between a predetermined normal state of alignment of the said object relative to a reference plane and the preset threshold level for triggering an alarm signal wherein the tilt sensing means includes a calibration means configured to automatically set the normal state of alignment of the said object at any tilt angle relative to a reference plane when first mounted and thus not requiring the security device, in use, to be mounted in a precisely defined position relative to the vertical and/or horizontal position, and wherein the tilt sensing means includes a resetting means configured to monitor the tilt movement of said object, and to reset the normal state of alignment of said object to any other tilt angle after an alarm condition has occurred and when said object is detected as being tilted in a different position from the previous normal state of alignment, and wherein the tilt sensing means includes a recalibration means wherein the tilt alarm threshold of said object is configured to be checked at regular intervals for any change of tilt movement by unauthorized movement of the object to enable, in use, said object to recalibrate to a new tilt angle when said object has remained in a stationary position for a predetermined period of time.

2. A security device according to claim 1 further including a sensitivity adjustment means for adjusting the tilt angle of the tilt sensor in degrees or fractions of a degree to enable the tilt alarm threshold to be adjusted and set between a high sensitivity and a low sensitivity.

3. A security device according to claim 1 wherein the control means is a programmable microcontroller unit.

4. A security device according to claim 1 wherein the alarm signal is fed to a signal receiving means, the signal receiving means being adapted to receive signals from the sensing means and initiate an alarm condition.

5. A security device according to claim 1 wherein the device includes an output means that is adapted to activate an audible alarm and/or a visual alarm and/or trigger an alarm panel switch associated with a building alarm system and/or be adapted via a short message service gateway to send an short message service message and/or to send an electronic mail message over an electronic network of computers.

6. A security device according to claim 1 wherein the tilt sensing means is adapted with a transmitter means, the transmitter means being provided with a unique identification code to send a coded alarm signal via a wireless communications means to a signal receiving means, the signal receiving means being adapted to receive a coded alarm signal and identify the transmitter means.

7. A method of monitoring the status of an object using a tilt sensing means, the tilt sensing means including a tilt sensor and a control means, the method including the steps of:
   a. mounting the tilt sensing means directly on said object and allowing the tilt sensing means to automatically calibrate to set the normal state of alignment of the said object relative to a reference plane, the tilt sensing means including a calibration means configured to automatically set the normal state of alignment of the said object at any tilt angle relative to a reference plane when first mounted and thus not requiring the security device, in use, to be mounted in a precisely defined position relative to the vertical and/or horizontal position, and for resetting the normal state of alignment of said object to any other tilt angle after an alarm condition caused by unauthorized movement of the object and when the object is in a different position from the previous normal state of alignment, and wherein the tilt alarm threshold of said object is configured to be checked at regular intervals for any change of tilt movement caused by unauthorized movement of the object to enable, in use, said object to recalibrate by way of a recalibration means to a new tilt angle when said object has remained in a stationary position for a predetermined period of time;
   b. selecting user operating preferences including a tilt alarm threshold representing the threshold of movement or non movement between a normal state and the tilt alarm threshold above which an alarm state condition occurs; and
   c. generating and sending an alarm signal when the alarm condition occurs.

8. A method according to claim 7 wherein in step b. the sensing means is configured to repeatedly self recalibrate to reset the normal state of alignment of the said object relative to a reference plane to allow for small variations in movement of the object within the preset tilt alarm threshold.

9. A method according to claim 7 wherein in step c. the tilt sensing means is adapted with a transmitter means to send an alarm signal via a wireless communications means to a signal receiving means, and wherein the signal receiving means is adapted to trigger an alarm means when an alarm state in a tilt sensing means has occurred.

10. A method according to claim 9 wherein in step b. the tilt alarm threshold is adjustable by a sensitivity adjustment means, the sensitivity adjustment means being configured and arranged to adjust tilt angle.

11. A method according to claim 7 for detecting the non-movement of an object wherein in step b. the normal state is when the object is in continual movement within a preset tilt time threshold, and wherein the alarm state is activated when the object stops moving for a longer time period than a preset tilt time threshold.

12. A method according to claim 9 further comprising the step of the tilt sensing means generating and sending periodically a supervision signal to the signal receiving means to confirm that the tilt sensing means is functioning, and, if the signal receiving means does not receive a supervision signal within a predetermined period of time, a trouble alarm will be activated to indicate a fault condition with the tilt sensing means.

13. A security monitoring system for use in monitoring an object, the security system, in use, being mounted directly to the said object, the security system including a tilt sensing means, the tilt sensing means including a tilt sensor and a control means configured and adapted to detect tilt movement of the said object and generating an alarm signal when the detected change of tilt movement of the said object or person exceeds a tilt alarm threshold, the change of tilt movement is between a predetermined normal state of alignment of the said object relative to a reference plane and the preset threshold level for triggering an alarm signal, the alarm signal being fed to a signal receiving means, the signal receiving means being adapted to receive the alarm signal from the tilt sensing means and trigger an alarm state, and wherein the tilt sensing means includes a calibration means configured to automatically set the normal state of alignment of the said object at any tilt angle relative to a reference plane when first mounted, and thus not requiring the security device, in use, to be mounted in a precisely defined position relative to the vertical and/or horizontal position, and for resetting the normal state of alignment of said object to any other tilt angle after an alarm condition caused by unauthorized movement of the object and when the object is in a different position from the previous normal state of alignment, and wherein the tilt alarm threshold of said object is configured to be checked at regular intervals for any change of tilt movement by a recalibration means to enable, in use, said object to recalibrate to a new tilt angle when said object has remained in a stationary position for a predetermined period of time.

14. A system according to claim 13 wherein the signal receiving means is adapted to activate an audible alarm and/or a visual alarm and/or trigger an alarm panel switch associated with a building alarm system and/or be adapted via a short message service gateway to send an short message service message and/or to send an electronic mail message over an electronic network of computers when it receives an alarm signal from the tilt sensing means.

15. A system according to either claim 13 or claim 14 wherein the tilt sensing means is adapted with a transmitter means to send an alarm signal via a wireless communications means to the signal receiving means adapted to receive the said alarm signal.

16. A system according to claim 15 wherein the tilt sensing means is adapted with a transmitter means, the transmitter means being provided with a unique identification code to send a coded alarm signal via a wireless communications means to a signal receiving means, the signal receiving means being adapted to receive a coded alarm signal and identify the transmitter means.

17. A system according to claim 16 wherein a plurality of tilt sensing means are monitored by the signal receiving means, and wherein the signal receiving means will identify and distinguish signals received from each tilt sensing means.

* * * * *